United States Patent Office 3,496,020
Patented Feb. 17, 1970

3,496,020
LEAD-ACID BATTERY PLATE HAVING A NETWORK OF PLASTIC MATERIAL THROUGHOUT THE POROUS STRUCTURE
Ernest J. Jackson, Racine, and Anthony Sabatino, Milwaukee, Wis., assignors to Globe-Union Inc., Milwaukee, Wis., a corporation of Delaware
No Drawing. Continuation of application Ser. No. 296,474, July 22, 1963. This application July 3, 1968, Ser. No. 752,431
The portion of the term of the patent subsequent to Aug. 6, 1980, has been disclaimed
Int. Cl. H01m 39/00, 35/08
U.S. Cl. 136—26    2 Claims

ABSTRACT OF THE DISCLOSURE

An unformed battery plate for lead-acid batteries consisting of a perforated grid sheet and a porous structure adhered to said grid sheet; such porous structure containing lead oxide, and small amounts of a foam producing and foam stabilizing agent, and having throughout a network of a vinyl resin plastic which provides rigidity sufficient for handling such plate and maintains a low density consistency during such handling.

---

This application is a continuation of our copending application Ser. No. 296,474 filed July 22, 1963, now abandoned.

This invention relates to a low density active paste material for battery plates and the method of making such material.

For a background to this invention, reference is made to copending application Ser. No. 857,566, filed Dec. 7, 1959, now United States Letters Patent No. 3,100,162, and assigned to the assignee of this application. The method of such copending application involves two basic steps. The first step is that of making a slurry of lead oxide and the second is the aeration of the slurry with a gas containing carbon dioxide to thereby redistribute the water in the slurry and produce a paste of the desired characteristics of density and consistency in a greatly improved manner over prior methods.

This invention relates to a refinement of such method wherein battery paste of extremely low density can be manufactured. Battery plates made from the low density paste of this invention are of a very porous nature wherein the pores lead into the interior of the plate interconnecting with other interior pores. This network of pores provides an increased surface area available to the electrolyte during the discharge process resulting in greatly increased battery capacity particularly at high rates of discharge.

In the practice of this invention the slurry is made from a paste-like mixture of (1) lead oxide, (2) water, (3) a small amount of foam producing agent, (4) a small amount of a stabilizing agent, and (5) strengthening materials thoroughly dispersed in such slurry for providing the required mechanical strength to the resultant low density battery plate.

The above ingredients are thoroughly intermixed in any suitable manner such as by homogenizing-type mixer producing a high rate of shear to convert the mixture to a liquid slurry. No specific procedure must be followed in making the slurry, however, it has been found that one of the two alternate procedures is preferable depending on the circumstances. The first such procedure is to first mix the water and the stabilizing agent along with a suitable plastic strengthening material emulsified in water and then to add a dry powdered mixture of lead oxide and foam producing agent to the liquid in the mixer. The second is to simply make a dry mixture of lead oxide, stabilizing agent and foam producing agent and add it to the water in the mixer with the emulsion of plastic strengthening material added either before or after the dry ingredients.

Lead oxide used in making a battery paste is commercially available in various forms. The particular type used will depend on whether a positive or negative plate is to be made and upon other variables (such as particle size and percentage of free lead) well known to those skilled in the art.

Similarly, the foam producing agent and stabilizing agent selected for use in mixing the slurry may be of various types. Such agents, of course, must be compatible with each other and not form any undesirable compounds with sulfuric acid in the finished battery. Generally speaking, it has been found that both anionic and nonionic type foam producing agents and fluorinated agents are suitable for use in the process. Specific examples of foam producing agents used satisfactorily in the process are sodium lauryl sulfate, the sodium salt of an alkylnaphthalene acid and fluoroalkyl phosphonate. The amount of foam producing agent used can vary from about 0.13% to about 1.00% by weight of the mixture.

The stabilizing agent which serves to stabilize the slurry before it is aerated and to stabilize the paste after aeration may also be of various types. Specific types which have proven satisfactory are sodium carboxymethylcellulose (also known as sodium cellulose glycolate) and poylvinyl alcohol. The amount of stabilizing agent used can vary from about .20% to about 1.50% by weight of the mixture.

The strengthening material may also be of different types. For example, it has been found that vinyl resin plastics emulsified in water are satisfactory. Specifically, water emulsions of polyvinyl chloride and polyvinyl acetate provide good results. Other materials may also be used as long as they are of a non-reactive material which materials is to provide a mechanical stiffener for the finished storage battery. The purpose of the strengthening material is to provide a mechanical stiffener for the finished plate to thereby maintain sufficient rigidity in the very porous low density type plates which the method of this invention is designed to produce. The amount of the strengthening material used will vary from about .08% to about 1.00% by weight of the mixture depending primarily upon the type of material used. When using water emulsions of vinyl polymers such as polyvinyl chloride and polyvinyl acetate the anionic surfactant used to emulsify such vinyl polymers serves as the foam producing agent in the resultant lead oxide slurry.

The slurry, as prepared above, is an essentially stable product to thus permit its storage for relatively long periods of time. The main consideration during storage is the evaporation of water from the slurry which will have an effect on the final product if such water is not replaced. During the mixing of the slurry there are no uncontrollable and irreversible chemical reactions occurring which give off heat, etc. and cause corrosion and safety problems as is the case with prior methods using sulfuric acid as a bulking agent.

The second major step of the method is the aeration of the oxide slurry with a suitable gas to redistribute the water in the slurry and thereby produce a battery paste of the desired characteristics. Broadly speaking, this is accomplished by bringing the materials in the slurry and a suitable gas containing carbon dioxide into intimate contact with each other. The slurry can be aerated by the use of any suitable apparatus such as by pumping the liquid slurry into a mixing chamber into which a suitable gas is introduced under pressure by means of a plurality of jets mounted in the wall of the chamber. This can be a continuous process wherein the material is pumped through the aerating chamber and is mixed as it passes therethrough.

During this step the foam producing agent in the slurry serves to depress the surface tension of the water and thus facilitate the formation of gas bubbles in the paste. The stabilizing agent in the slurry serves to modify the surface of the lead oxide particles and causes them to adhere in a uniform pattern to the gas bubbles which are formed. The result is a paste in which the water content has been thoroughly and uniformly redistributed to provide a paste having a predetermined and accurately controlled density and consistency suitable for application to a battery grid. By virtue of the aeration step described above a paste having improved characteristics of physical stability is produced which will not lose its consistency upon subsequent mechanical manipulation during application to a battery grid by suitable grid pasting machinery.

There are various gases and mixtures of gases which may be used to aerate the slurry. It has been found, however, that best results are obtained by the use of a gas containing a substantial proportion of carbon dioxide with any gas used in a mixture with carbon dioxide being substantially inert to the slurry.

Having indicated in a general way the nature and purpose of the invention, the following specific examples are offered as illustrative embodiments:

EXAMPLE I

The slurry was made by preparing 175 grams of a 2.00% solution of sodium carboxymethylcellulose in water. To this solution was added: (1) 5 grams of a water emulsion of polyvinyl chloride containing about 2–6% by weight of an anionic surfactant such as sodium lauryl sulfate, and (2) 454 grams of leady litharge (containing about 25% free lead and no expanders for making positive battery plates). The slurry was thoroughly intermixed and then aerated with carbon dioxide gas to produce a foamed paste for application to a battery grid. The battery plates produced by the method of this example had a density of 2.60 grams/millilitre.

EXAMPLE II

The slurry was made by preparing 150 grams of a 2.00% solution of sodium carboxymethylcellulose in water. To this solution was added: (1) 5 grams of a water emulsion of polyvinyl chloride containing about 2–6% by weight of an anionic surfactant such as sodium lauryl sulfate, and (2) 454 grams of leady litharge (containing about 25% free lead and no expanders for making positive battery plates). The slurry was thoroughly intermixed and then aerated with carbon dioxide gas to produce a foamed paste for application to a battery grid. The battery plates produced by the method of this example had a density of 3.02 grams/millilitre.

EXAMPLE III

The slurry was made by preparing 290 grams of a 3.00% solution of sodium carboxymethylcellulose in water. To this solution was added: (1) 5 grams of a water emulsion of polyvinyl chloride containing about 2–6% by weight of an anionic surfactant such as sodium lauryl sulfate, and (2) 454 grams of leady litharge (containing about 25% free lead and no expanders for making positive battery plates). The slurry was thoroughly intermixed and then aerated with carbon dioxide gas to produce a foamed paste for application to a battery grid. The battery plates produced by the method of this example had a density of 1.89 grams/millilitre. Such plates were tested and yielded 2.22 ampere-hour per ounce at a 10 ampere rate at room temperature, as compared with 1.95 ampere-hour per ounce for a conventional plate.

EXAMPLE IV

The slurry was made by preparing 125 grams of a 2.00% solution of sodium carboxymethylcellulose in water. To this solution was added: (1) 2.5 grams of a water emulsion of polyvinyl acetate containing about 2–6% by weight of an anionic surfactant such as sodium lauryl sulfate and (2) 454 grams of leady litharge (containing about 25% free lead and no expanders for making positive battery plates). The slurry was thoroughly intermixed and then aerated with carbon dioxide gas to produce a foamed battery paste for application to a battery grid. The battery plates produced by the method of this example had a density of 2.81 grams/millilitre. Such plates were tested at −32° F. at a 40 ampere rate and yielded 0.177 ampere-hour per ounce of active material as opposed to 0.089 ampere-hour per ounce of active material yield from a conventional plate.

As stated previously, various gases and mixtures thereof have been used successfully in the practice of this invention. In the specific examples outlined above, the slurry was aerated by the introduction of substantially pure carbon dioxide gas under approximately 20 p.s.i.g. through four 1/64 inch diameter nozzles located in the bottom of the drum in which the slurry was mixed.

In addition to the use of substantially pure carbon dioxide as indicated in the specific examples listed above, it has been found that various mixtures of carbon dioxide with other gases can be employed with satisfactory results. Specific examples of such other gases (used with carbon dioxide) are argon, nitrogen, oxygen and air. As to the nature of gas or gases other than carbon dioxide used in the aerating mixture, the main requirement is that such gas or gases be substantially inert to the slurry.

For best results the percentage of carbon dioxide in the mixture should be over 50% but it has been found that some foaming of the slurry is produced by aerating with a gas containing as little as about 5% to 10% carbon dioxide. The particular percentage of carbon dioxide to be used will vary with a number of factors such as the desired consistency of the paste to be manufactured and the consistency of the slurry to be foamed. Generally speaking, it has been found that as the percentage of carbon dioxide in the aerating gas is increased the more thorough will be the redistribution of water in the paste to thereby produce a paste having a more sand-like and a less fluid-like consistency.

Although several embodiments of the present invention have been illustrated and described, it will be apparent to those skilled in the art that various changes and modifications may be made therein without departing from the spirit of the invention or from the scope of the appended claims.

What is claimed is:

1. A battery plate of the unformed type to be used in lead-acid batteries and possessed of sufficient rigidity to maintain its low density consistency upon subsequent mechanical manipulation prior to being subjected to the addition of acid and forming comprising:
   a grid sheet perforated to define interstices;
   a porous structure adhered to said grid sheet containing lead oxide, small amounts of a foam producing agent and foam stabilizing agent, and a network of plastic material throughout said porous structure to provide sufficient rigidity to permit mechanical manipulation essential to handling said plate during assembly and to maintain the low density consistency during mechanical manipulation of said plate prior to the adding of acid and forming thereof;
   said plastic material comprised of a vinyl resin selected from the group consisting of polyvinyl chloride and polyvinyl acetate.

2. A battery plate according to claim 1 in which the density of said porous structure is from 1.89 grams/millilitre to 3.02 grams/millilitre.

References Cited

UNITED STATES PATENTS

| | | | |
|---|---|---|---|
| 2,738,375 | 3/1956 | Schlotter | 136—30 |
| 3,060,254 | 10/1962 | Urry | 136—24 |
| 3,100,162 | 8/1963 | Sabatino et al. | 136—26 |
| 1,944,065 | 1/1934 | Chamberlain | 136—26 |
| 2,981,776 | 4/1961 | Dunn et al. | 136—27 |
| 3,017,447 | 1/1962 | Orsino et al. | 136—26 |
| 3,194,685 | 7/1965 | Malloy | 136—27 |
| 2,677,713 | 5/1954 | Weil et al. | 136—26 |
| 3,125,621 | 3/1964 | Coppick | 264—50 X |

WINSTON A. DOUGLAS, Primary Examiner

A. SKAPARS, Assistant Examiner

U.S. Cl. X.R.

136—27